United States Patent [19]

Nicholas

[11] Patent Number: 5,244,993

[45] Date of Patent: Sep. 14, 1993

[54] SULFATE-TERMINATED VINYLIDENE FLUORIDE POLYMERS OF CONTROLLED MOLECULAR WEIGHT

[75] Inventor: Paul P. Nicholas, Broadview Heights, Ohio

[73] Assignee: The B. F. Goodrich Company, Akron, Ohio

[21] Appl. No.: 12,072

[22] Filed: Feb. 1, 1993

Related U.S. Application Data

[62] Division of Ser. No. 864,753, Apr. 7, 1992, Pat. No. 5,194,508.

[51] Int. Cl.$^5$ ............................................. C08F 14/18
[52] U.S. Cl. .................................................... 526/255
[58] Field of Search ........................................ 526/255

[56] References Cited

U.S. PATENT DOCUMENTS

| | | |
|---|---|---|
| 3,315,013 | 4/1967 | Tocker . |
| 3,345,317 | 10/1967 | Hoashi ................................ 526/255 |
| 3,378,604 | 4/1968 | Acker et al. . |
| 4,025,709 | 5/1977 | Blaise et al. ......................... 526/255 |
| 4,442,261 | 4/1984 | Kennedy et al. . |
| 4,524,197 | 6/1985 | Khan .................................. 526/255 |
| 4,845,156 | 7/1989 | Cohen . |
| 4,916,191 | 4/1990 | Takeuchi et al. . |
| 4,929,692 | 5/1990 | Goldenberg . |
| 4,933,408 | 6/1990 | Goldenberg . |

FOREIGN PATENT DOCUMENTS

| | | |
|---|---|---|
| 0103975 | 3/1984 | European Pat. Off. ............. 526/255 |
| 0276957 | 8/1988 | European Pat. Off. . |
| 62-13422 | 1/1987 | Japan . |
| 1-138527 | 5/1989 | Japan . |
| 2-199108 | 8/1990 | Japan . |
| 836741 | 6/1960 | United Kingdom ................. 526/255 |
| 1011577 | 12/1965 | United Kingdom ................. 526/255 |

OTHER PUBLICATIONS

An article entitled "Chain Microstructure of Poly(Vinylidene Fluoride) By 282 MHz $^{19}$F-NMR Spectroscopy" from *J. Macromol. Sci.-Chem.*, 1989, A26, by Fu-Tyan Lin and Fu-Mei Lin, pp. 1-16.

An article entitled "Kinetics and Mechanism of Oxidants by Peroxydisulfate" by D. A. House from *Chem. Rev.*, 1961, 185-203.

An article entitled "Synthesis of a Poly(Vinylidene Fluoride) Macromer" by J. Oku, R. J. H. Chan, H. K. Hall, Jr., and O. R. Hughes, from *Polymer Bulletin*, 1986, 16, 481-485.

An article entitled "Electron Spin Resonance Studies. Part XXV. Reactions of the Sulphate Radical Anion with Organic Compounds," by R. O. C. Norman, P. M. Storey, and P. R. West, *J. Chem. Soc.*, 1970, 1087-1095.

An article entitled "Pulse Radiolysis Studies on the Oxidation of Organic Radicals in Aqueous Solution," by G. E. Adams and R. L. Willson, *Trans. Faraday Soc.*, 1969, 65, 2981-2987.

*Primary Examiner*—Joseph L. Schofer
*Assistant Examiner*—N. Sarofim
*Attorney, Agent, or Firm*—Hudak & Shunk Co.

[57] ABSTRACT

Polymers prepared from vinylidene fluoride having controlled molecular weights and sulfate end groups are described. The sulfate end group can be displaced with acrylic-type acids to produce the corresponding acrylate terminated poly(vinylidene fluoride) macromolecular monomers. These macromolecular monomers can be copolymerized with acrylates that give rubbery homopolymers to form thermoplastic elastomers.

11 Claims, 2 Drawing Sheets

Tensile Strain Curves for the Copolymers and Physical Blends of Poly($VF_2$)/Poly(ethyl acrylate) With Nominally 20% $VF_2$.

Tensile Strain Curves Copolymers and Physical Blends of Poly($VF_2$)/Poly(ethyl acrylth Nominally 30% $VF_2$.

SULFATE-TERMINATED VINYLIDENE FLUORIDE POLYMERS OF CONTROLLED MOLECULAR WEIGHT

CROSS-REFERENCE

This is a division of application Ser. No. 07/864,753, filed Apr. 7, 1992, of Paul Peter Nicholas, for Macromolecular Monomers of Vinylidene Fluoride. Acrylate-Terminated Poly(Vinylidene Fluoride) and Its Copolymeric Thermoplastic Elastomers, now U.S. Pat. No. 5,194,508.

FIELD OF THE INVENTION

The present invention relates to the polymerization of vinylidene fluoride into functionally terminated polymers which are converted to macromolecular monomers by acid catalyzed displacement reactions with acrylic-type acids. These macromolecular monomers can be copolymerized with acrylates to make thermoplastic elastomers or compatibilizing agents.

BACKGROUND

F-T. Lin and F-M. Lin in *J. Macromol. Sci. Chem.*, 1989, A26 (1), 1. This work generally relates to the characterization of NMR peaks in vinylidene fluoride.

D. A. House, *Chem. Rev.* 1962, 185. This article relates to $K_2S_2O_8$ initiating systems in the presence of alcohols.

J. Oku, R. J. H. Chan, H. K. Hall, Jr., and O. R. Hughes, *Polymer Bulletin*, 1986, 16, 481. This article relates to the synthesis of hydroxy terminated poly(vinylidene fluoride) by homogeneous free radical polymerization. The end group in this polymer is derived from methanol, the polymerization solvent. The macroalcohol is then reacted with methacryloyl chloride to form methacrylate-terminated poly(vinylidene fluoride) which is reported to copolymerize with methyl methacrylate, producing a thermoplastic.

SUMMARY OF THE INVENTION

Figure 1:
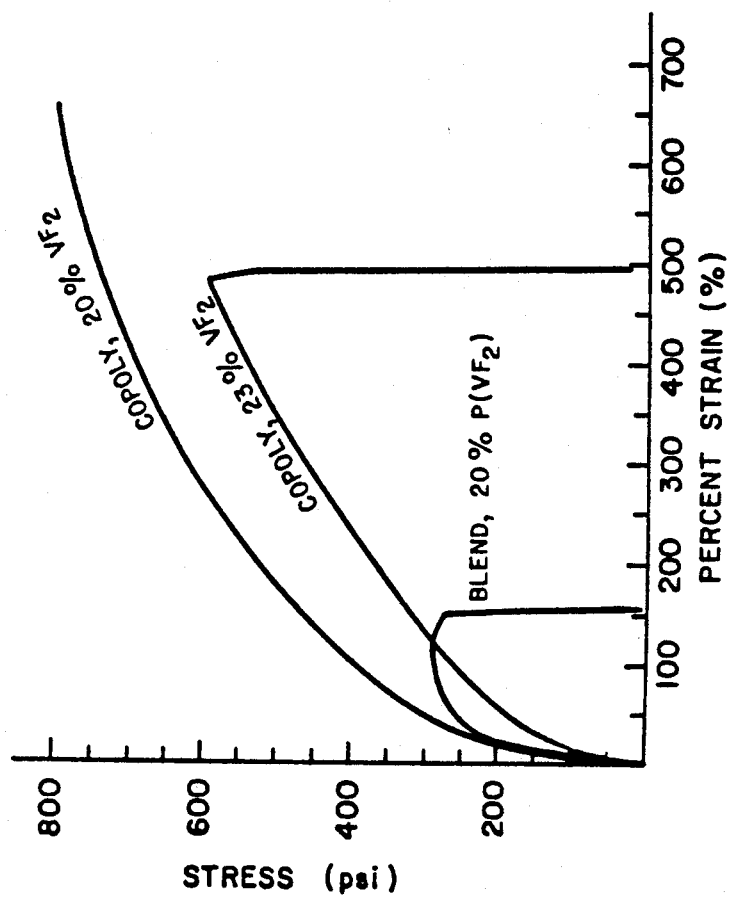
FIGS. 1 and 2 show the stress/strain curves for blends and graft copolymers poly(VF$_2$)/poly(ethyl acrylate).

Sulfate-terminated vinylidene fluoride polymers of controlled molecular weight are produced by persulfate-initiated emulsion polymerization of vinylidene fluoride in the presence of low molecular weight alcohols. The polymers can be converted to macromolecular monomers by displacement of the sulfate end group with acrylic-type acids in the presence of acid catalysts. The macromolecular monomers can be copolymerized with simple acrylate monomers. When the acrylate is one that gives rubbery homopolymer, the resulting poly(acrylate-co-macromolecular monomer) is a thermoplastic elastomer which can be used in seals, gaskets and molded items.

DETAILED DESCRIPTION OF THE INVENTION

Sulfate-terminated poly(vinylidene fluoride)

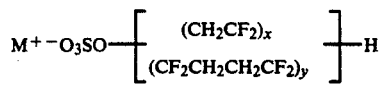

The present invention relates to vinylidene fluoride (VF$_2$) polymerized free radically by persulfate initiators in the presence of an alcohol to give polymers with controlled molecular weight and $-O_3SO-$ head groups, structure 1. Emulsion polymerization under pressure is the preferred method. Both primary and secondary alcohols can be used. They can vary in size from $C_1$ to $C_{10}$ with $C_1$ to $C_4$ being preferred, and primary alcohols being most preferred. The amount of alcohol can vary from 0.002 moles to 2.5 moles per mole of VF$_2$, desirably about 0.003 moles to 2.0 moles per mole VF$_2$, and preferably 0.003 moles to 1.5 moles per mole of VF$_2$. Ideally, this ratio should be maintained by metering. The alcohols are believed not to be chain transfer agents, but rather inhibitors, where the alcohol-derived radical rapidly terminates following hydrogen transfer. This conclusion is based on the surprising observation that alcohol-derived radicals neither start nor end the poly(vinylidene fluoride) chains in this system. The greater partitioning of higher alcohols into the organic phase is believed to make them more effective in limiting the molecular weight. Thus, the amount of alcohol required can vary greatly depending on the specific alcohol used.

When carried out by emulsion polymerization, the weight of monomer charged per 100 grams of water can range from 5 to 50 g with a preferred amount being from 10 to 25 grams. The preferred surfactant is a salt of perfluorooctanoic acid in an amount from about 0.25 to about 1.5 grams per 100 of monomer. However, typical nonfluorinated anionic surfactants, such as sodium octanoate and dodecylsulfate are also effective. A buffer can be used to stabilize the pH during the polymerization. One preferred buffer is $K_2HPO_4$ which can be used from about 0.05 to about 1.5M. Potassium persulfate is the preferred initiator for this system. However, persulfates with other common counter ions, such as sodium or ammonium, are also effective. The amount of persulfate can vary from about 5 to 100 millimoles per mole of monomer with the preferred amount being from 10 to 20 millimoles per mole of monomer. The reaction temperature can vary from ambient to 120° C. However, the range from 50° to 100° C. is preferred, with 70° to 90° C. being most preferred. At these temperatures, vinylidene fluoride is a gas and develops a pressure that depends on the moles of vinylidene fluoride present, temperature, and the volume of the reactor head space. After the reaction temperature has been reached, the reaction time is typically 2–4 hours at 80°–90° C.

The molecular weight of the polymer 1 is controlled by the amount and kind of alcohol used. Lower molecular weight polymers are obtained with increasing amounts of alcohol, higher alcohols being more efficient. Generally, primary alcohols are preferred over secondary alcohols. The average number of VF$_2$ repeat units, $n = x + 2y$, can vary from about 8 to about 300, with the preferred range depending on the application. Attractive thermoplastic elastomers can be prepared from macromolecular monomers with n equal to about 20 to about 100, with a preferred range of about 20 to about 65. When used as compatibilizing agents, the value of n is from about 50 to about 200 with a preferred range of about 75 to about 150. Although the repeat unit of poly(vinylidene fluoride) is written as ($CH_2CF_2$), it is known that the monomer is sometimes incorporated into the chain with reverse addition (head to head) to give small amounts of the sequence ($CH_2CF_2CF_2CH_2$). These are known variations from the normal head to tail addition. For simplicity, the structure 1 can be expressed as structures 2 or 3, wherein ($CH_2CF_2$) or (A) is meant to include the variations described more specifically in the structure 1, wherein said ($CH_2CF_2$) or (A) represents the repeat unit which is present in any orientation within the chain, either head to tail, head to head, or both. $M^+$ represents a common counterion for the sulfate terminated poly(vinylidene fluoride). These common counterions could be sodium, potassium, ammonium and the like.

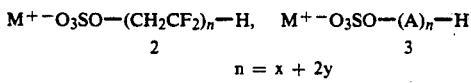

$$n = x + 2y$$

Nuclear Magnetic Resonance (NMR) spectroscopy is used to characterize the sulfate-terminated poly(vinylidene fluoride). It is performed at 200 MHz with DMSO-$d_6$ as the solvent. Table I shows the chemical shift and fine structure assignments for the various hydrogens. The chemical structure of the polymer is shown below with $H_a$–$H_h$ in Table I being the hydrogen atoms labeled (a)-(h). There is no evidence of alcohol-derived radicals appearing as end-groups in the polymer. $H_a$ is the only resonance observed in the region of $\delta 4.0$ where the $\alpha$-hydrogen of the alcohol would appear.

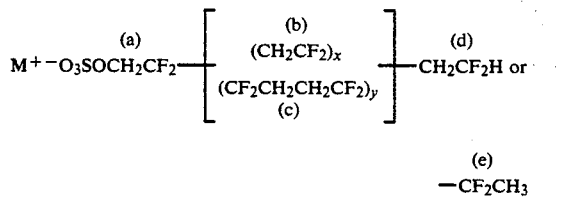

TABLE I

Chemical Shifts of Sulfate-Terminated Poly(Vinylidene Fluoride)

| Chemical Shift (δ) | J(Hz) | Assignment |
|---|---|---|
| 3.95(t) | 13.5 | $H_a$ |
| 2.88(m) | | $H_b$ |
| 2.25(m) | | $H_c$ |
| 6.34(t,t) | 4.5, 55 | $H_d$ |
| 1.78(t) | 19.4 | $H_e$ |

This invention will be better understood by reference to the following examples which serve to illustrate but not to limit the present invention.

EXAMPLE 1

A 500 mL pressure reactor was fitted with agitator, liquid sampling line, vacuum line, thermowell, and vapor/liquid charging line. The reactor was then evacuated to 0.1 mm Hg. A solution comprising 2.46 g (9.12 mmol) $K_2S_2O_8$, 3.63 g $K_2HPO_4$, and 1.04 g perfluorooctanoic acid in 208 mL of distilled water was purged with nitrogen. Immediately before transferring to the reactor, 3.49 g of purged ethanol (0.0758 mol) was added, and the mixture was transferred under vacuum. The lower half of the reactor was cooled in liquid nitrogen and $VF_2$ (36.3 g, 0.568 mol) was distilled into the reactor from a tared lecture bottle. The reactor was warmed, stirring was started (1200 rpm), and the reaction proceeded for 2.7 hours from the time the reactor contents reached 70° C. Typically, approximately 20 minutes were required to reach this temperature. The polymerization was followed by measuring total solids and ended when pressure became constant. The reactor was cooled and the contents discharged. Water was evaporated by gently heating on a hot plate. The salts were removed by stirring with 10% aqueous ammonia. The mixture was centrifuged to recover the polymer particles. They were suspended in fresh water and centrifuged three more times. The solids were dried in a vacuum oven at 50° C. overnight. The yield was 10.7 g of polymer, 30% conversion.

EXAMPLE 2

A 5 liter reactor, equipped similarly to the reactor in Example 1, was used for a scaled-up reaction. The reactor was evacuated and filled with nitrogen several times. It was then evacuated and cooled to −10° C. The nitrogen-purged aqueous solution containing 24.6 g (91.2 mmol) $K_2S_2O_8$, 10.4 g perfluorooctanoic acid, 36.3 g $K_2HPO_4$, and 34.9 g (0.758 mol) of ethanol in 2.08 liters of water were charged to the reactor after purging with nitrogen in the usual way. This was followed by liquid charging of 363 g (5.68 mol) of $VF_2$. The temperature controller was set for 84° C. and heating was started. When the contents reached 8° C., stirring was started and gradually increased to 900 RPM. The contents reached 70° C. in 44 minutes at a pressure of 521 psi. An exotherm to 85° C. was reached in 57 minutes at a pressure of 484 psi. After 155 minutes had elapsed, the temperature had declined to 80° C. (458 psi). The reactor was then cooled to 28° C. and the contents were discharged, giving a stable, creamy foam. A white solid separated on standing. This latex/solids mixture was centrifuged to remove the solid which was air dried at 70° C. The remaining liquid was evaporated, yielding additional white solid. Both solid portions were stirred overnight with a 10-fold volume of water, centrifuged, rinsed, and centrifuged again before drying at 50° C. overnight. The combined yield was 66.0 g, 18.2% conversion.

The following table gives data summarizing the above examples together with several additional polymerizations which were carried out in a similar manner.

TABLE II

Persulfate-Catalyzed Emulsion Polymerization of $VF_2$ at 80° C. in the Presence of Alcohols Forming Sulfate-Terminated Poly(Vinylidene Fluoride)

| | 1 | 2 | 3 | 4 | 5 | 6 | 7 | 8 | 9 | 10 | 11 |
|---|---|---|---|---|---|---|---|---|---|---|---|
| $VF_2$ (mol) | 0.284 | 0.568 | 0.568 | 0.568 | 0.568 | 0.568 | 0.568 | 0.568 | 5.68 | 4.26 | 4.69 |
| Alcohol (mol) | methanol | methanol | methanol | methanol | n-butanol | ethanol | ethanol | ethanol | ethanol | ethanol | ethanol |

TABLE II-continued

Persulfate-Catalyzed Emulsion Polymerization of VF$_2$ at 80° C. in the Presence of Alcohols Forming Sulfate-Terminated Poly(Vinylidene Fluoride)

|  | 1 | 2 | 3 | 4 | 5 | 6 | 7 | 8 | 9 | 10 | 11 |
|---|---|---|---|---|---|---|---|---|---|---|---|
| Mol Ratio, Alcohol VF$_2$ | 0.568 2.00 | 0.568 1.00 | 1.14 2.00 | 1.14 2.00 | .0379 0.067 | .0339 0.060 | 0.0758 0.133 | 0.152 0.268 | 0.758 0.134 | 1.52 0.357 | 0.758 .162 |
| K$_2$S$_2$O$_8$ (mmol) | 9.12 | 9.12 | 9.12 | 17.5[b] | 9.12 | 9.12 | 9.12 | 9.12 | 91.2 | 182. | 91.2 |
| Max P (psi) | 295. | 460. | 500. | 500. | 460. | 390. | 465. | 480. | 521. | 446. | 500. |
| VF$_2$ Conv (%) | 8.2 | 31. | 6.4 | 5.9 | 9.0 | 52. | 30. | 4.1 | 18. | 6.7 | 14.3 |
| Mol Ratios |  |  |  |  |  |  |  |  |  |  |  |
| O$_3$SOCF$_2$CH$_2$—[a] | 0.058 |  | 0.052 |  | 0.047 |  | 0.11 | 0.097 | 0.11 | 0.093 | 0.084 |
| O$_3$SOCH$_2$CF$_2$— | 1.00 |  | 1.00 |  | 1.00 |  | 1.00 | 1.00 | 1.00 | 1.00 | 1.00 |
| —CH$_2$CF$_2$H | 0.81 |  | 1.02 |  | 0.99 |  | 1.15 | 0.83 | 0.92 | 0.90 | 0.95 |
| —CF$_2$CH$_3$ | 0.18 |  | 0.15 |  | 0.26 |  | 0.32 | 0.20 | 0.27 | 0.15 | 0.22 |
| (CH$_2$CF$_2$) in x | 11.4 |  | 11.3 |  | 16.3 |  | 83.8 | 18.4 | 64.7 | 17.8 | 32.2 |
| (CH$_2$CF$_2$) in y | 0.66 |  | 0.59 |  | 0.76 |  | 9.12 | 1.8 | 6.9 | 1.66 | 2.96 |
| $\overline{DP}$[c] | 12 | — | 10 | — | 14 | — | 63 | 20 | 61 | 19 | 30 |

[a]estimated by assuming that the mol ratio, O$_3$SOCF$_2$CF$_2$—/O$_3$SOCH$_2$CF$_2$ = [(CH$_2$CF$_2$) in y]/[(CH$_2$CF$_2$) in x]
[b]9.12 mmol originally charged followed by later charge of 8.37 mmol
[c]degree of polymerization calculated from (CH$_2$CF$_2$)$_n$ ÷ [—CF$_2$H + —CF$_2$CH$_3$] from H-NMR.

Table II, columns 7–11 show that the degree of polymerization of sulfate-terminated poly(vinylidene fluoride) can be controlled from between about 20 and 60 with an ethanol:VF$_2$ mol ratio of 0.357 to about 0.133. Columns 1–4 further show that $\overline{DP}$ can be reduced to as low as 10 to 12 when methanol:VF$_2$ is 2.0. These results show that ethanol is more efficient than methanol in lowering molecular weight. That n-butanol is even more efficient is illustrated in column 5. A $\overline{DP}$ as low as 14 is obtained when n-butanol:VF$_2$ is 0.067. Monomer conversion is also influenced by the amount and kind of alcohol used, and it varies from between 4 and 52% under these conditions. In general, there is good agreement between the head and end groups, with their mol ratio being close to 1.0. Moreover, there is no evidence of end groups derived from the alcohol.

The sulfate-terminated polymers 1 are precursors to macromolecular monomers of controlled molecular weight. They can react with nucleophilic reagents such as alcohols, thiols, water, or carboxylic acids in so-called nucleophilic displacement reactions, where the nucleophile replaces the sulfate group on the sulfate-terminated poly(vinylidene fluoride) 1.

Acrylate-Terminated Poly(vinylidene fluoride)

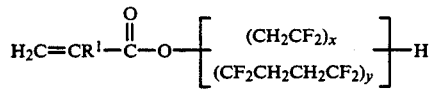

or alternatively expressed as

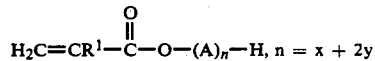

The macromolecular monomers of this invention can be described by the structures 4 and 5, wherein said A represents the repeat unit (CH$_2$CF$_2$) which is present in any orientation within the chain, either head to tail (x), head to head (y), or both with n representing the total number of such units.

The macromolecular monomers 4 are made from the reaction of acrylic (R$^1$=H) or methacrylic (R$^1$=CH$_3$) acid, the sulfate-terminated poly(vinylidene fluoride) 1, catalytic H$_2$SO$_4$, and optionally 2,6-tert-butyl-4-methyl-phenol (BHT) at elevated temperatures. Sulfate-terminated poly(vinylidene fluoride) with degrees of polymerization (n) from about 8 to 300 can be used. The macromolecular monomers can be copolymerized with other monomers to give various graft copolymers that can serve as thermoplastic elastomers or compatibilizing agents. The degrees of polymerization for thermoplastic elastomers are from about 8 to about 100, desirably from about 20 to about 100, and with the preferred range being about 20 to about 65. When used in compatibilizing agents, the degree of polymerization would be from about 50 to 200, and preferably from about 75 to 150.

Acrylic or methacrylic acid is used as a solvent and reactant in an amount ranging from about 3.0 to about 30 mL/g of sulfate-terminated poly(VF$_2$). The preferred amount is from about 5.0 to about 10 mL/g. Other optional swelling agents or solvents include dimethyl sulfoxide (DMSO), N,N-dimethylformamide (DMF), and N,N-dimethyl acetamide (DMAC). Sulfuric acid catalyzes the reaction. It can be used in an amount of from about 0.025 to about 0.50 mL/g of sulfate-terminated poly(VF$_2$). The preferred amount is 0.10–0.25 mL/g. Other strong acids such as phosphoric acid also catalyze the reaction. Butylated hydroxy toluene (BHT) can be included as an antioxidant. The amount can be from 0.0 to about 0.020 g/g of sulfate-terminated poly(VF$_2$). Other phenolic antioxidants may be substituted for BHT. The reaction temperature may range from 50° to 200° C. with the preferred temperature range being 80°–120° C., typically 100° C. The reaction time varies with temperature. At 100° C. the reaction is accomplished in 1.5 hours. Typically, excess acrylic or methacrylic acid is distilled off and the macromolecular monomers precipitated from a suitable nonsolvent such as hexane. The precipitate is washed in a stirred 5% aqueous NaHCO$_3$ solution, vacuum filtered, rinsed several times with water, and vacuum dried at room temperature overnight. Alternatively, the reaction can be performed under Reaction Processing conditions using an appropriately designed extruder.

H-NMR can be used to fully characterize the structure of methacrylate-terminated poly(vinylidene fluoride) 6. The spectra are for DMSO-d$_6$ solutions at 200 MHZ. The structural formula for 6 is given below with the hydrogen atoms labeled. These labels identify the chemical shifts for each type of hydrogen in Table III.

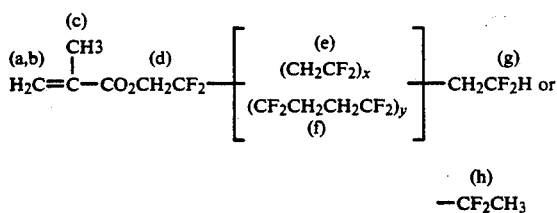

TABLE III

| Chemical Shifts of Methacrylate-Terminated Poly(vinylidene fluoride) | | |
|---|---|---|
| Chemical Shift (δ) | J(Hz) | Assignment |
| 6.11, 5.78(s) | | $H_{a,b}$ |
| 1.90(s) | | $H_c$ |
| 4.46(t) | 13.9 | $H_d$ |
| 2.88(m) | | $H_e$ |
| 2.24(m) | | $H_f$ |
| 6.33(t,t) | 4.5, 55 | $H_g$ |
| 1.77(t) | 19. | $H_h$ |

The area under each peak is proportional to the number of hydrogens of that type, and these data converted to mol ratios are given in Table V.

GPC molecular weight distributions for the acrylate terminated poly($VF_2$) can also be obtained when performed with a solvent that prevents sorption on the column. Methyl pyrrolidone containing 0.05 ppm of LiBr appears to work well (Table IV). In general, the molecular weight distributions are bimodal, though they approach a unimodal distribution at $\overline{DP}$ 60. Since K and α values for poly($VF_2$) are unknown, true molecular weights can be estimated by applying the polystyrene calibrations, then adjusting those molecular weights by a factor (0.61) that corresponds to the comparative extended chain formula weights. This should be a reasonable approximation in this case since methyl pyrrolidone is a good solvent for poly($VF_2$). The GPC results nicely complement the H-NMR results since the latter gives only a single, average value for $\overline{DP}$.

TABLE IV

| Comparison of GPC and H-NMR Determined Molecular Weight of the Macromolecular monomers 6 | | | | | |
|---|---|---|---|---|---|
| GPC MOL WEIGHT × $10^{-3}$ | | | | | H-NMR |
| Mn | Mw | Peaks | Mw/Mn | $\overline{DP}$ | $\overline{DP}$ |
| 4.08 | 15.3 | 1.32, 10.7 | 3.75 | 64 | 60 |
| 2.94 | 10.6 | 0.903, 7.99 | 3.60 | 46 | 34 |
| 1.60 | 5.15 | 1.36, 9.40 | 3.22 | 25 | 20 |

This invention will be better understood by reference to the following examples which serve to illustrate but not to limit the present invention.

EXAMPLE 3

A three neck, 100 mL flask was fitted with distillation column/water cooled condenser, bubbler, magnetic stirring bar, thermocouple, and septum. Ten grams of sulfate-terminated poly(vinylidene fluoride), 75 mL of methacrylic acid, and 0.0186 g BHT were charged to the reactor. The mixture was stirred and 2.5 mL of conc $H_2SO_4$ was injected. The flask was heated to 100° C. and maintained at that temperature for 1.5 hours. The flask was then cooled to 55°–58° C. at which time the bubbler was removed and about one-third of the methacrylic acid was distilled off at 5–7 mm Hg. After cooling to room temperature, the reactor contents were precipitated from 300 mL of rapidly stirred hexane. A gummy yellow/brown precipitate formed. The solid was separated from the hexane by centrifuging. The precipitate was vigorously stirred with 300 mL of 5% aqueous $NaHCO_3$, during which time the solid became harder and lightened in color. The mixture was vacuum filtered, rinsed several times with water, and vacuum dried overnight at room temperature. The yield was 9.55 grams.

The following table gives data to summarize the above examples plus several additional syntheses which were carried out in a similar manner.

TABLE V

| Solvolysis of Sulfate-Terminated Poly($VF_2$) in Methacrylic Acid Catalyzed by $H_2SO_4$ at 100° C. | | | | | |
|---|---|---|---|---|---|
| | 1 | 2 | 3 | 4 | 5 |
| Polymer 1 (g) | 10.0 | 30.0 | 5.0 | 5.0 | 29. |
| Methacrylic Acid (mL) | 75. | 225. | 37.5 | 37.5 | 218. |
| Conc $H_2SO_4$ (mL) | 2.5 | 7.7 | 1.3 | 1.3 | 7.4 |
| BHT (mg) | 18.6 | 0 | 0 | 9.3 | 0 |
| Time (hr) | 1.5 | 1.0 | 1.5 | 2.0 | 1.5 |
| Yield (%) | 96. | 100. | 85. | 80. | 84. |
| $\overline{DP}^a$ of Macromolecular monomer | 60 | 41 | 20 | 34 | 42 |
| $\overline{DP}$ of Polymer 1 | 61 | 30 | 19 | 30 | 35 |
| Mol Ratios | | | | | |
| $H_{a,b}$ | 1.08 | 1.15 | 0.98 | 1.02 | 1.00 |
| $H_c$ | 1.10 | 1.10 | 1.01 | 1.01 | 1.04 |
| $H_d$ | 1.00 | 1.00 | 1.00 | 1.00 | 1.00 |
| $MA—CH_2CF_2—$ | 1.00 | 1.00 | 1.00 | 1.00 | 1.00 |
| $^bMA—CF_2CH_2—$ | 0.097 | 0.076 | 0.075 | 0.071 | 0.090 |
| $O_3SO—CH_2CF_2—$ | 0.10 | 0.079 | 0.13 | 0.10 | 0.033 |
| $HO—CH_2CF_2$ | 0.10 | 0.17 | 0.088 | 0 | 0.16 |
| $(CH_2CF_2)$ in x | 93. | 52. | 24. | 49. | 58. |
| $(CH_2CF_2)$ in y | 10. | 4.3 | 1.9 | 4.3 | 5.7 |
| $—CH_2CF_2H$ | 1.18 | 1.23 | 1.14 | 1.27 | 1.20 |
| $—CF_2CH_3$ | 0.55 | 0.16 | 0.14 | 0.26 | 0.30 |

$^a$calculated from total $(CH_2CF_2)/[—CF_2H + —CF_2CH_3]$;
$^b$estimated by assuming that the ratio, $MACF_2CH_2/MACH_2CF_2 = (CH_2CF_2)$ in y/$(CH_2CF_2)$ in x Table V shows five different reactions of methacrylic acid with sulfate-terminated poly(vinylidene fluoride) to produce macromolecular monomers. The degree of polymerization (DP) of the macromolecular monomers is similar to that of the sulfate-terminated poly(vinylidene fluoride), and the yields are very good. The utility of this macromolecular monomer is that it can be copolymerized with other monomers to impart useful properties originating from the poly(vinylidene fluoride) grafts. Physical crosslinks originating from the crystallization of these grafts is one example. These domains have excellent solvent resistance and thermal stability (mp 150°–170° C.).

Copolymers of Macromolecular Monomer with Other Monomers

The macromolecular monomers 5 can be copolymerized with one or more acrylates of structure 7 under homogeneous free radical conditions; wherein $R^2$=H or methyl and $R^3$ can be a $C_1$ to $C_{12}$ radical, which can optionally contain the heteroatoms nitrogen, oxygen, or sulphur in the chain or appended to the chain. Examples of $R_3$ include butyl, nonyl, dodecyl, oxa and thialkyl, epoxy and thioepoxyalkyl, halogenated alkyl, aminoalkyl.

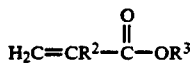

$$H_2C=CR^2-\overset{\overset{O}{\|}}{C}-OR^3 \quad 7$$

The preferred $R^1$ group in the macromolecular monomer 5 is H or $CH_3$, while the preferred $R^3$ groups in the acrylate monomers 7 are $C_2$ to $C_8$ alkyl free of heteroatoms. Optionally, other monomers that copolymerize with acrylates and methacrylates can also be used, including styrene and alkyl or halogen-substituted styrenes, 1,4-dienes, acrylic acid and methacrylic acid, acrylamide, N-substituted acrylamides and acrylonitrile. When such optional comonomers are used they can be present up to an amount equal to said acrylate monomers or desirably less than 80 weight percent of the amount of acrylate monomers, and preferably less than 60 weight percent of the amount of the acrylate monomers. The weight percent of the macromolecular monomer 5 in the copolymer can range from 3 to 70, and is preferably about 10 to about 50. The weight percent of poly($VF_2$) in the copolymer can range from about 3 to about 50 and is preferably about 10 to about 50. If the resulting copolymer is to be a thermoplastic elastomer, the weight percent macromolecular monomer 5 is preferably 10-40. The copolymerization can be performed in a solvent in which the macromolecular monomer and acrylate monomer 7 are soluble. Examples include DMSO, DMF, or DMAC. Alternatively, if the macromolecular monomer swells or dissolves in the monomer at the polymerization temperature, the reaction might be done with little or no solvent. Copolymerization with little or no solvent is referred to as reaction processing and can be performed in an appropriately designed extruder. Solvents are used in amounts sufficient to achieve a miscible system, wherein the radical chain ends can access all of the monomers, and to allow for mixing of the reactants and polymeric product. This amount can be from 0 to about 15 times the combined weight of monomers. Polymerization is performed with free radical initiators. With 2,2-azobis(2-methylbutanenitrile), the range is from about 0.50 to about 4.0 mg of initiator/mmol of acrylate 7. Since both monomer and macromolecular monomer are acrylate type monomers, any of the free radical initiators typically used for acrylate monomers can be used such as persulfates, azo, and peroxide initiators. When performed in solution, the preferred initiators are the azo type with AIBN or 2,2-azobis(2-methylbutanenitrile) being the most preferred. The polymerizations are done in an inert atmosphere of nitrogen or argon.

The choice of initiator depends on the polymerization temperature desired and can be from ambient to 200° C. (reaction processing). With 2,2-azobis(2-methylbutanenitrile), the preferred temperature is about 55°-65° C. The copolymer can be recovered by precipitation from methanol and centrifugation. Drying is performed under vacuum at 80° C.

This invention will be better understood by reference to the following examples which serve to illustrate but not to limit the present invention.

EXAMPLE 4

Analytical Scale, Copolymerization of Macromolecular Monomer with Ethyl Acrylate A 100 mL, 3-neck flask, fitted with a paddle stirrer, condenser/bubbler, thermocouple/controller, nitrogen inlet, and septum was charged with 3.00 g of the macromolecular monomer 6 and 40 mL of DMSO (HPLC grade). The mixture was stirred and purged with nitrogen or argon. The flow of argon or nitrogen was reduced and 8.1 mL of nitrogen-purged ethyl acrylate (7.5 g, 0.075 mol) was injected into the reactor. The reactor was then heated to 60° C. A solution of 0.124 g (0.630 mmol) of 2,2-azobis(2-methylbutanenitrile) in 30 mL DMSO (HPLC grade) was purged and metered into the reaction flask at 0.80 mL/min for 22.5 min., thereby delivering 73 mg, 0.38 mmol of initiator. The conversion to copolymer was followed by percent solids. After 2.7 hours, the reactor was cooled, and the homogeneous, viscous reaction mixture was added to 800 mL of vigorously stirred methanol. After stirring 1 hour, the mixture was centrifuged and the recovered solid rinsed with fresh methanol and centrifuged three additional times. The solids were air dried, then vacuum dried at 80° C. to yield 5.32 g of light brown rubber. The methanol solution was evaporated to recover 1.8 g of soft and somewhat sticky polymer.

EXAMPLE 5

Preparative Scale, Copolymerization of Macromolecular Monomer with Ethyl Acrylate The reaction was performed in a 3-neck 1 L flask with paddle stirrer, condenser/bubbler, and 3 port adapter, thermocouple/controller, and two septa. The flask was charged with 430 mL of DMSO (HPLC grade), 23 g of macromolecular monomer 6, and the mixture was purged with argon. Under reduced argon flow, 56.9 g (0.569 mol) of argon-purged ethyl acrylate was then added and the reactor heated to 60° C. Ten mL of a degassed solution of 1.4296 g of 2,2-azobis(2-methylbutanenitrile) in 25 mL DMSO was then injected. An exotherm occurred which maintained the temperature at 63°-64° C. The solution rapidly became viscous and difficult to both stir and remove samples. Heating was stopped after 64 min. reaction time and the reaction mixture diluted with 100 mL of DMSO to facilitate transfer. The apparently homogeneous solution was added to 4.5 liters of methanol that was vigorously stirred with a propeller stirrer. The mixture was centrifuged and the recovered solids rinsed with fresh methanol and centrifuged an additional three times. The solids were air dried and then vacuum dried at 80° C. overnight giving 48.4 g of tan rubber. A methanol soluble fraction of 5.0 g was also recovered.

The following table gives data to summarize the above examples plus several additional polymerizations which were carried out in a similar manner.

TABLE VI

Copolymerization of the Macromolecular Monomer 6
with Ethyl Acrylate at 60° C. in DMSO.
Preparation of Graft Copolymers with Varying Levels
and $\overline{DP}$ of Macromolecular monomer 6

|  | 1 | 2 | 3 | 4 | 5 | 6 | 7 | 8 |
|---|---|---|---|---|---|---|---|---|
| Charge | | | | | | | | |
| Macromolecular Monomer 6 (g) | 3.00 | 3.00 | 2.40 | 2.29 | 1.50 | 1.50 | 2.00 | 23.0 |
| EA (g) | 7.50 | 7.41 | 3.60 | 5.70 | 7.42 | 7.37 | 4.96 | 56.9 |
| Initiator (mg)[a] | 72.6 | 74.5 | 75.9 | 30.0 | 74.3 | 73.0 | 49.7 | 572. |
| DMSO (mL, total) | 58. | 58. | 48. | 54. | 58. | 58. | 38. | 440. |
| $\overline{DP}$ of Macromolecular monomer | 60. | 41. | 41. | 20. | 41. | 60. | 48. | 42. |
| Initiator Delivery[b] | meter | meter | meter | meter | meter | meter | inject | inject |
| Delivery Time (min) | 45. | 23. | 23. | 22. | 22. | 22. | — | |
| Reaction Time (hr) | 3.86 | 2.67 | 23.5 | 3.58 | 3.25 | 5.73 | 4.05 | 1.07 |
| EA Conversion (%) | 52. | 64. | 63. | 43. | 78. | 73. | 67. | 62. |
| % Yield[c] | 99. | 92. | 93. | 92. | 99. | 84. | 90. | 92. |
| VF$_2$ in Copolymer (wt %)[d] | 40. | 33. | 54. | 45. | 23. | 20. | 37. | 39. |

[a]2,2-azobis(2-methylbutanenitrile), [b]metered as a 0.021 M solution in DMSO over delivery time shown or injected immediately as a 0.30 M solution; [c]based on converted EA; [d]H-NMR.

The H-NMR spectra of the copolymers show that the macromolecular monomer is polymerized. The vinyl hydrogen atoms, normally at $\delta 6.11$ and $\delta 5.78$ are absent while the end group, $CF_2H$, at $\delta 6.3$ is prominent and readily observable. Table VI shows that ethyl acrylate conversions of 43 to 78% are readily achieved and that nearly all of the copolymerized ethyl acrylate and macromolecular monomer were recovered in the final product. The H-NMR-determined weight percent of poly(vinylidene fluoride) shows a high incorporation of macromolecular monomer.

Characteristics of the Thermoplastic Elastomer Formed

Acrylate polymers formed by free radical polymerizations are often found to contain insoluble fractions due to crosslinking reactions. A sample of 0.200 g of copolymer from Run 2, Table VI was dissolved in 10 mL DMSO and stirred 20 hours at 60°-65° C. The solution was filtered through a coarse sintered glass filter funnel with Celite filter aids. A gravimetric determination showed that 67% of the polymer was soluble indicating that some crosslinking had occurred.

The term thermoplastic elastomer means a material combining the good mechanical properties of a thermoset elastomer or rubber, like acrylate rubbers, with the ability of thermoplastics to be molded and remolded. The advantage provided by such materials is that they avoid the costly curing process of thermoset elastomers. The curing processes are costly for many reasons. They are time consuming and require accurate measurements of curing agents and their thorough incorporation. When thermoset materials are cured, they can no longer be reprocessed without breaking chemical bonds.

Thermoplastic elastomers (TPE) have hard and soft segments or domains in the polymer molecule or compound. The soft regions are responsible for rubber-like properties while the hard regions act as physical crosslinks, adding strength and toughness to the TPE.

In this invention, the acrylate polymer is generally the elastomer or soft regions while the poly(vinylidene fluoride) segments are the hard regions. Poly(vinylidene fluoride) is a crystalline polymer. When grafted to rubbery polyacrylates, the poly(vinylidene fluoride) chains associate into crystalline domains, producing physical crosslinks that function in the same way as chemical crosslinks in creating good mechanical properties.

Figure 2:
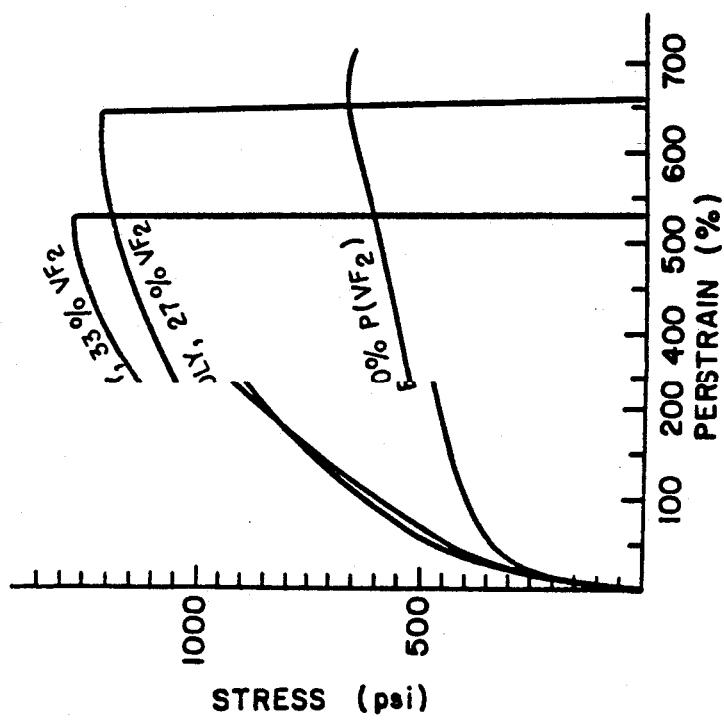

The mere incorporation of a thermoplastic polymer in an elastomer can enhance properties in some cases, but they tend not to act as physical crosslinks because there is little or no chemical connectivity between the thermoplastic and the elastomer. To demonstrate the improvement of thermoplastic elastomers over physical blends of two homopolymers, stress/strain curves for blends and graft copolymers are incorporated in this description as FIGS. 1 and 2. The copolymers used in FIGS. 1 and 2 are from Table VI.

At about 20 and 30% VF$_2$, the blends have a pronounced "knee" in the stress/strain curve and they undergo flow with permanent extension during the strain measurements. The corresponding copolymers, on the other hand, are much more elastic and return to nearly their original shape when broken. Moreover, the area under the stress-strain curve is significantly greater for most of the copolymers. These data are preliminary in that only one test specimen for each composition was tested rather than groups of 3 or 5. Indeed, the copolymers show advantages over the blends in that they are more elastic, undergo less flow under strain; and in most cases, they absorb more mechanical energy. Thus, the crystalline, poly(VF$_2$) phase clearly provides physical crosslinks in this system.

Dynamic Scanning Colorimetry (DSC) and microscopy measurements clearly confirm that these copolymers have the morphology required of thermoplastic elastomers. The macromolecular monomer segments readily crystallize with melting peaks in the vicinity of 160° C. Table VII shows the DSC-measured melting peaks and $\Delta H$ for various macromolecular monomers and copolymers. Moreover, optical microscopy performed on the copolymer containing 33% VF$_2$ (Run #2 Table VI) recrystallized isothermally from the melt (135° C.) shows a dense, uniform distribution of spherulites on the order of about 4–5 μm. Still smaller spherulites develop when crystallized from DMSO solution. The crystallites must generally be small since the molded samples are translucent.

TABLE VII

DSC Data For The Macromolecular monomers 6 and Graft Copolymers with Ethyl Acrylate[a].

| | % $VF_2$ | $\overline{DP}$ Macromolecular monomers | Melting Peaks, °C.[b] | ΔH (J/g)[b] | ΔH (J/g) $VF_2$ Component[c] |
|---|---|---|---|---|---|
| Macromolecular monomer[d] | 100 | 61 | 164, 170 | 69 | 69 |
| Macromolecular monomer | 100 | 41 | 160, 165 | 58 | 58 |
| Macromolecular monomer | 100 | 20 | 71, 119, 147, 156 | 60 | 60 |
| Poly($VF_2$)[e] | 100 | — | 159 | 48 | 48 |
| Poly($VF_2$)[f] | 100 | — | 170 | 60 | 60 |
| Copolymer | 54 | 41 | 160, 165 | 28 | 52 |
| Copolymer | 33 | 41 | 159 | 18 | 55 |
| Copolymer | 23 | 41 | 160 | 8.2 | 36 |
| Copolymer | 45 | 20 | 158, 163 | 18 | 40 |

[a]PE thermal analyzer, 1st scan 30–200° C., 2nd scan −40 to 200° C. @ 40° C./min;
[b]second heat;
[c]ΔH Sample/wt fraction of $VF_2$;
[d]methacrylate end group ignored;
[e]lab synthesis;
[f]Kynar ® 721, Atochem (formerly Pennwalt).

In Table VII, rows 1–3 show that both the macromolecular monomers and copolymers are crystalline with a melting point in the 120°–160° C. range. The two columns of ΔH values confirm that in most cases, the poly(vinylidene fluoride) component develops nearly the same degree of crystallinity as do homopolymers of vinylidene fluoride.

Thermoplastic elastomers are used in automotive, wire and cable, adhesives, footwear, and mechanical goods. The high crystalline melting point of the poly(vinylidene fluoride) domains together with their excellent solvent resistance makes these acrylate-based thermoplastic elastomers useful in seals, gaskets, and molded items.

While in accordance with the Patent Statutes, the best mode and preferred embodiment has been set forth, the scope of the invention is not limited thereto, but rather by the scope of the attached claims.

What is claimed is:

1. A sulfate-terminated poly(vinylidene fluoride) having the formula $$M^+ {}^-O_3SO-(A)_n-H$$

wherein said A represents the repeat unit, ($CH_2CF_2$), which is present in any orientation within the chain, either head to tail, head to head, or both; wherein n is from about 8 to about 300; and wherein $M^+$ is a monovalent cation.

2. A sulfate-terminated poly(vinylidene fluoride) according to claim 1, wherein said polymer is made by emulsion polymerization and wherein said value of n is from about 20 to about 100.

3. A sulfate-terminated poly(vinylidene fluoride) according to claim 2, wherein said value of n is from about 20 to about 65, and wherein $M^+$ is $K^+$, $Na^+$, or $NH_4^+$.

4. A sulfate-terminated poly(vinylidene fluoride) according to claim 1, wherein said polymer is made by emulsion polymerization, and wherein said value of n is from about 50 to about 200.

5. A process for the production of sulfate-terminated poly(vinylidene fluoride) comprising polymerizing by free radical emulsion polymerization vinylidene fluoride in the presence of 0.002 to 2.5 moles of at least one primary or secondary alcohol or mixtures thereof per mole of vinylidene fluoride, and wherein the initiator is a persulfate initiator and the primary or secondary alcohols have from 1 to 10 carbon atoms.

6. A process of claim 5, wherein the alcohols have from 1 to 4 carbon atoms and are primary alcohols.

7. A process of claim 5, wherein radicals derived from said alcohol generally do not become end groups in the poly(vinylidene fluoride) produced.

8. A process of claim 6, wherein from about 10 to about 25 grams of said vinylidene fluoride is used per 100 grams of water, wherein from about 10 to about 20 millimoles of persulfate are used for each mole of said vinylidene fluoride, and wherein the polymerization temperature is from about 50° C. to about 100° C.

9. A product by the process of claim 5, wherein the poly(vinyldene fluoride) has a degree of polymerization from about 20 to about 200.

10. A product of claim 9, wherein the degree of polymerization of the poly(vinylidene fluoride) is from about 8 to about 300.

11. A product by the process of claim 7, wherein the degree of polymerization of the poly(vinylidene fluoride) is from about 20 to about 100.

* * * * *